(12) United States Patent
Glanz et al.

(10) Patent No.: US 10,497,962 B2
(45) Date of Patent: Dec. 3, 2019

(54) ELECTRODE INCLUDING AN INCREASED ACTIVE MATERIAL CONTENT

(71) Applicant: Robert Bosch GmbH, Stuttgart (DE)

(72) Inventors: Leonore Glanz, Asperg (DE); Harald Bauer, Ehningen (DE); Juergen Hackenberg, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 15/702,249

(22) Filed: Sep. 12, 2017

(65) Prior Publication Data

US 2018/0076474 A1 Mar. 15, 2018

(30) Foreign Application Priority Data

Sep. 13, 2016 (DE) .................. 10 2016 217 369

(51) Int. Cl.
*H01M 4/02* (2006.01)
*H01M 10/00* (2006.01)
*H01M 4/04* (2006.01)
*H01M 4/36* (2006.01)
*H01M 4/70* (2006.01)
*H01M 4/13* (2010.01)
(Continued)

(52) U.S. Cl.
CPC ............ *H01M 10/00* (2013.01); *H01M 4/04* (2013.01); *H01M 4/043* (2013.01); *H01M 4/13* (2013.01); *H01M 4/139* (2013.01); *H01M 4/36* (2013.01); *H01M 4/366* (2013.01); *H01M 4/661* (2013.01); *H01M 4/70* (2013.01)

(58) Field of Classification Search
CPC .......... H01M 4/13; H01M 4/70; H01M 4/366; H01M 4/36; H01M 4/661; H01M 4/64; H01M 4/04; H01M 4/0404; H01M 4/043; H01M 4/139; H01M 10/00; H01M 10/02; H01M 10/05; H01M 10/052; H01M 10/0525

See application file for complete search history.

(56) References Cited

U.S. PATENT DOCUMENTS

2011/0183182 A1* 7/2011 Woehrle .................. H01M 2/30
429/149
2014/0272547 A1 9/2014 Ramasubramanian et al.
(Continued)

FOREIGN PATENT DOCUMENTS

DE 102013204875 A1 9/2014
EP 1644136 A2 4/2006

OTHER PUBLICATIONS

C. Cao, et al. in "Recent advances in inorganic solid electrolytes for lithium batteries," Front. Energy Res., 2014, 2:25.
(Continued)

*Primary Examiner* — Raymond Alejandro
(74) *Attorney, Agent, or Firm* — Norton Rose Fulbright US LLP; Gerard Messina (57) ABSTRACT

An electrode that includes at least one current collector having a flat configuration and to which at least one arrester is attached, and at least one active material foil. The at least one active material foil is situated on a first surface of the current collector, and protrudes beyond the current collector on all sides along its edges to form an overhang of the active material foil past the outer boundary of the current collector on all sides.

4 Claims, 5 Drawing Sheets (51) Int. Cl.
*H01M 4/139* (2010.01)
*H01M 4/66* (2006.01)

(56) References Cited

U.S. PATENT DOCUMENTS

| | | |
|---|---|---|
| 2014/0308576 A1 | 10/2014 | Gaben et al. |
| 2015/0061176 A1 | 3/2015 | Bruckner et al. |
| 2015/0062779 A1 | 3/2015 | Bankaitis et al. |
| 2016/0043375 A1 | 2/2016 | Saitoh et al. |

OTHER PUBLICATIONS

Knauth, Philippe "Inorganic solid Li ion conductors: An overview", Solid State Ioniks 180 (2009), pp. 911-916.

* cited by examiner

ELECTRODE INCLUDING AN INCREASED ACTIVE MATERIAL CONTENT

RELATED APPLICATION INFORMATION

The present application claims priority to and the benefit of German patent application no. 10 2016 217 369.3, which was filed in Germany on Sep. 13, 2016, the disclosure which is incorporated herein by reference.

FIELD OF THE INVENTION

The present invention relates to an electrode including an increased active material content, and a method for manufacturing same.

BACKGROUND INFORMATION

The performance, in particular the energy density, of electrochemical energy storage systems such as lithium-ion batteries (LIB) depends essentially on the selection and the configuration of the electrodes in the cell. Two fundamentally different methods for coating the current collector with the active material (also referred to below as active material) are discussed in the related art, namely, by applying an active material slurry (so-called slurry application process) and by applying a free-standing active material foil (see, for example, EP 1 644136, US 2015/0061176 A1, or US 2015/0062779 A1).

Patent document DE 10 2013 204 875 A1 provides a method in which a dry active material composition is applied to a current collector. In one specific embodiment, a mask is used, which is placed on the current collector prior to the coating step in order to selectively exclude areas from the covering with active material.

Patent document US 2016/0043375 A1 provides a secondary battery that includes an electrode stack that is obtained by stacking planar battery cells which include a charge layer and a lead electrode. The lead electrode may be completely enclosed by the electrodes of the battery cell.

The manufacture of electrodes from free-standing active material foils is believed to be understood from the related art and is discussed in EP 1 644136, US 2015/0061176 A1, or US 2015/0062779 A1, for example. The free-standing active material foil is produced in a solvent-free process, typically with a layer thickness of approximately 100 μm-300 μm. The free-standing foil is optionally cut to the desired size and subsequently applied to a preformed current collector. The cutting of the electrode may also take place in the laminated composite made up of the current collector and the active material foil. For manufacturing an electrochemical cell, at least one each of a cut anodic, negative electrode and a cathodic, positive electrode, divided by a separator, are packed into a housing (for example, in the form of a pouch or a solid housing (can)), and the housing is filled with an electrolyte. The electrolyte is ionically conductive, and surrounds the electrodes and the separator or penetrates into their pores.

The current collector is made of an electrically conductive material, in particular a metal, and has a flat configuration. According to the related art, the side edges of the current collector and of the active material layer are in flush alignment, or the current collector protrudes beyond the extension of the active material layer, at least on one side. The cut electrodes thus have more or less pronounced areas on each side that are made of uncoated current collector, in particular metal. To avoid an electrical short circuit within the cell, according to the related art the current collectors that protrude or that are not covered by active material are electrically insulated by targeted oxidation processes, for example. The cathodic current collector, which is often made of aluminum, may thus be insulated by the aluminum oxide that results. An alternative method uses electrically nonconductive plastics (rubber, for example) for sealing.

Alternatively, by a suitable selection of the geometries of the electrodes and of the nonconducting separator, there is also the option for configuring the cell in such a way that a short circuit is effectively prevented. The separator is configured in such a way that it protrudes beyond the edge of the electrodes, so that the electrodes are not able to come into contact with one another. This method requires precise alignment of the individual components during the stacking.

In addition to the contact of the electrodes with one another, the electrochemical cell manufactured according to the related art also entails the risk that the uncoated current collector may laterally contact the housing of the cell, and may even damage the cell over its service life. If insulation of the metal edges is dispensed with, here as well there is also the risk of an electrical short circuit.

Due to the described measures for preventing a short circuit within the cells, the portion of the volume of the cell that is not filled with active material increases and thus does not contribute to energy storage. The volumetric power density drops to the cell level.

The object of the present invention, therefore, is to provide an electrode that is protected from short circuits without a reduction in the power density of the battery cells. The aim is also to manufacture the electrode without additional method steps such as oxidation processes. This object is achieved by the present invention described below.

SUMMARY OF THE INVENTION

The present invention relates to an electrode that includes at least one current collector having a flat configuration and on which at least one arrester is mounted, and at least one active material foil, characterized in that the active material foil is situated on a first surface of the current collector, and protrudes beyond the current collector on all sides along its edges, in order to form an overhang of the active material foil past the outer boundary of the current collector on all sides.

The active material foil is a free-standing active material foil, and may be provided using all methods known to those skilled in the art. A dry active material composition may be used for this purpose. The active material composition may include components, known per se to those skilled in the art, for an appropriate energy store. For the nonlimiting case of manufacturing an electrode for a lithium-ion battery by way of example, the active material for an anode may include graphite, for example, which may be in a concentration of greater than or equal to 94% by weight, whereas the active material for a cathode may include, for example, a lithium oxide, for example lithium nickel cobalt manganese oxide (NCM) or lithium manganese oxide (LMO), and/or a lithium phosphate such as lithium iron phosphate (LiFePO$_4$), which may be in a concentration of greater than or equal to 93% by weight. The active material is thus in particular a material or a substance or a substance mixture that is able to take part in the active charging operations or discharging operations of an energy store. The active material mixture may also include a binder, for example polyvinylidene fluoride (PVDF), which may be in a concentration of less than or equal to 4% by weight, in which the above-described active material is distributed. In addition, a conductive additive, for example conductive carbon compounds such as carbon black, may be added, which may be in a concentration of less than or equal to 2% by weight.

In one specific embodiment, the active material composition may include as an additional component at least one solid-state electrolyte, in particular an inorganic solid-state electrolyte, that is capable of conducting cations, in particular lithium ions. According to the present invention, such solid inorganic lithium ion conductors include crystalline, composite, and amorphous inorganic solid lithium ion conductors. Crystalline lithium ion conductors include in particular lithium ion conductors of the perovskite type, lithium lanthanum titanates, lithium ion conductors of the NASICON type, lithium ion conductors of the LISICON and thio-LISICON types, and lithium ion-conducting oxides of the garnet type. The composite lithium ion conductors include in particular materials that contain oxides and mesoporous oxides. Such solid inorganic lithium ion conductors are described, for example, in the overview article by Philippe Knauth, "Inorganic solid Li ion conductors: An overview," Solid State Ionics, Volume 180, Issues 14-16, Jun. 25, 2009, pages 911-916. According to the present invention, all solid lithium ion conductors described by C. Cao, et al. in "Recent advances in inorganic solid electrolytes for lithium batteries," Front. Energy Res., 2014, 2:25, may also be included. In particular, the garnets described in EP 1723080 B1 are also included according to the present invention. The solid-state electrolyte may be used in particular in the form of particles having an average particle diameter of $\geq 0.05$ µm to $\leq 5$ µm, which may be $\geq 0.1$ µm to $\leq 2$ µm. If the active material composition includes a solid-state electrolyte, the latter may constitute, for example, 0% to 50% by weight, which may be 10% to 40% by weight, of the active material composition.

A paste-like, moldable compound may be formed from the composition via fibrillation processes. Such methods are known from the related art and described in EP 1 644 136, US 2015/0061176 A1, or US 2015/0062779 A1, for example. The moldable compound that is obtained may subsequently be formed into a free-standing active material foil. This may take place by use of a calander.

The free-standing active material foil has a layer thickness that allows nondestructive handling. The active material foil may have a layer thickness of at least 50 µm, for example 100 µm to 500 µm, in particular 150 µm to 300 µm. The active material foil may thus be nondestructively positioned on the flat, preformed current collector.

This type of current collector may be formed from an electrically conductive material, in particular a metal, that is known per se. For example, in the case where a positive electrode (cathode) is manufactured, the current collector may be made of aluminum, whereas the current collector may be made of copper, for example, in the case where a negative electrode (anode) is manufactured.

In addition, the current collector is preformed and has a flat configuration. Within the meaning of the present invention, a preformed current collector may mean in particular that the current collector may already have its desired, in particular final, shape at this point in time, i.e., essentially prior to application of the free-standing active material foil. Subsequent cutting, punching, or the like may thus be dispensed with. In particular, the current collector is present in the form of a flat sheet or a flat foil made of a conductive material, in particular a metal. Foils that include aluminum, copper, nickel, or alloys of these metals, and having a layer thickness which may be 5 µm to 500 µm, and in particular 50 µm to 300 µm.

The border areas of the current collector may in principle have any desired shape. However, it has been found that the shape or configuration of these border areas has an influence on the properties and the stability of the electrode. The border area may in particular have a straight, undulating, or perforated configuration. Combinations of these specific embodiments are also advantageous, for example an undulating configuration which at the same time has a perforation in the border area.

In one specific embodiment, the current collector has straight side edges. Current collectors configured in this way are in particular manufacturable using a simple arrangement, and may be easily stacked.

In another specific embodiment, at least one of the side edges of the current collector has an undulating configuration. All side edges may be configured in this way. The dimensioning of the undulating border configuration (amplitude, wavelength) is to be selected as a function of the layer thickness of the electrode and the properties of the selected materials of the current collector and of the active material foil in such a way that a electric field, which may be homogeneous, is formed in the border area. Without being limited thereto, the dimensioning varies, for example, in a range with a wavelength of 10 µm to 1000 µm and an amplitude of 10 µm to 1000 µm.

In one particular specific embodiment, at least one of the side edges of the current collector is at least partially provided with holes. It has been found that such a perforation of the current collector may reduce the electric field strength in this area. In order not to reduce the stability of the current collector too greatly, in particular in the border area, it must be ensured that the perforation also guarantees sufficient stability via a suitable size of the holes and/or a suitable distance between the holes. The perforation takes place, for example, with a hole diameter of 1 µm to 10 µm and a distance of 30 µm to 300 µm between the midpoints of adjacent holes. The area provided with such a perforation may be limited to an area of $\leq 20\%$, which may be $\leq 10\%$, of the direction of extension of the current collector.

The shape and size of the at least one active material foil are adapted to the shape and size of the current collector in such a way that the active material foil protrudes beyond the lateral boundaries of the current collector on all sides in order to be able to form an overhang of the active material foil past the outer boundary of the current collector.

At least one active material foil is applied to at least one surface of the current collector. In one specific embodiment of the present invention, the electrode includes two active material foils. These may be situated on a first surface of the current collector and on a second surface of the current collector, the second surface being situated opposite from the first surface. This means that the first surface of the current collector and the second surface of the current collector form a pair made up of the front side and the rear side of the current collector. The current collector is thus completely enclosed by the two active material foils. The two active material foils form a pocket that surrounds the current collector. This effectively prevents the undesirable contact of the current collector with other electrically conducting objects, such as further current collectors or the housing of an electrochemical cell that includes the current collector.

Tapping the electrical current from the electrode requires an electrically conducting arrester, which is attached in an electrically conducting manner to the current collector. The arrester may be configured, for example, in the form of an arrester plate as part of the current collector. The arrester may likewise be coated with the active material foil or with an electrically nonconductive material. However, the arrester has a freely accessible, conducting contact site at at least one point. This means that the arrester is not coated at at least one point.

The spatial configuration of the electrode is not limited. It may also be adapted to the intended purposes by providing filigreed configurations. This is made possible by the flat, preformed current collector and the preformed active material foils, which in principle may have any desired shape.

As explained above, the first active material foil is configured in such a way that it protrudes with an overhang beyond the border areas of the current collector. In one specific embodiment, this also applies for the at least one second active material foil. This specific embodiment may particularly be used, since the volumetric and gravimetric ratios of current collector material to active material may thus be improved, and the potential energy density of the electrode or of an electrochemical cell that includes the electrode may be increased. The overhang of the active material foil past the outer boundary of the current collector may be one to ten times the layer thickness of the active material foil. For example, for an active material foil having a layer thickness of 100 μm, the overhang is in a range of 100 μm to 1000 μm. If the overhang is too pronounced, discharging the current from the active material foil to the current collector can no longer be adequately ensured. In any case, the maximum overhang may be no greater than 5 mm.

A further subject matter of the present invention relates to a method for manufacturing such an electrode according to the present invention. The method includes the following method steps:
a) providing a flat, preformed current collector;
b) providing at least one free-standing active material foil;
c) applying the free-standing active material foil to a first surface of the flat, preformed current collector;
the active material foil protruding beyond the current collector on all sides along its edges in order to form an overhang of the at least one active material foil past the outer boundary of the current collector on all sides.

With regard to the components, the above discussion applies. The active material foil may be adapted to the shape of the flat, preformed current collector, so that a uniform overhang results along the edges of the current collector sheet. However, the overhang may also vary in a suitable manner, for example when the manufacture may thus be simplified. For example, as mentioned above, the current collector may have an undulating configuration. When the free-standing active material foil is now applied to the current collector, the former may likewise have an undulating configuration, resulting in a circumferential uniform overhang of active material foil that protrudes beyond the edge (outer boundary) of the flat, preformed current collector sheet. However, from a manufacturing standpoint it is advantageous to provide the active material foil with a straight cut edge. Active material foil should be dimensioned in such a way that even in its smallest extension it protrudes beyond the current collector sheet.

In one particular specific embodiment, at least two free-standing active material foils are used. The method according to the present invention then includes the following steps:
a) providing a flat, preformed current collector that has at least one first surface and one second surface;
b) providing a first free-standing active material foil;
c) applying the first free-standing active material foil to the first surface of the flat, preformed current collector;
d) providing at least one second free-standing active material foil,
e) applying the at least one second free-standing active material foil to the second surface of the flat, preformed current collector;
at least the first and/or the second active material foil protruding beyond the current collector on all sides along its edges in order to form an overhang of the at least one active material foil past the outer boundary of the current collector on all sides.

The first free-standing active material foil and the second free-standing active material foil may have the same geometry and extension, but may also be different from one another. In addition, the chemical composition and the structural configuration (in particular the layer thickness and the porosity) of the first and the second active material foils may be different from one another. However, in one specific embodiment the first and the second active material foils are identical. In this case, the method relates to two free-standing active material foils, both the first active material foil and the second active material foil protruding beyond the current collector on all sides along its edges, and forming an overhang of the at least one active material foil past the outer boundary of the current collector on all sides.

The application of the first and/or the second active material foil may be carried out by placing the free-standing active material foil or the free-standing active material foils on the flat, preformed current collector and subsequently pressing it/them with the aid of a press, a punch, or a roller. A strong adhesive bond between the active material foil and the current collector may thus be achieved. Forming the bond may be assisted in particular by gentle heating of the current collector sheet and/or the active material foil. Softening of the binder is thus achieved, which allows an improvement in the adhesive bond. The temperature may be selected in such a way that it is above glass transition temperature $T_g$ of the binder contained in the active material foil. The temperature particularly may be in a range of more than 10° C. above glass transition temperature $T_g$ and more than 20° C. below melting temperature $T_m$ of the binder.

In one specific embodiment, the first and the second active material foils are joined together on all sides in the area of the overhang past the current collector by pressing. This allows a particularly close joint of the active material foils to one another. In addition, greater compression may take place in this area. Furthermore, this step may take place at an elevated temperature, in particular at a temperature above the glass transition temperature $T_g$ of the binder contained in the active material foil. The temperature particularly may be in a range of more than 10° C. above glass transition temperature $T_g$ and more than 20° C. below melting temperature $T_m$ of the binder. Alternatively, an adhesion promoter, for example a thermoplastic polymer, may be applied to the at least one surface of the current collector in order to improve the adhesive bond between the active material foil and the current collector.

A further subject matter of the present invention relates to an electrode that has been obtained according to the method according to the present invention. Such an electrode may be used as an electrode in an electrochemical energy storage system or as an electrode in a fuel cell. Within the meaning of the present invention, electrochemical energy storage systems include in particular lithium-ion batteries, supercapacitors, and hybrid supercapacitors. A further subject matter of the present invention therefore relates to an electrochemical energy storage system that includes at least one electrode according to the present invention, and a fuel cell that includes at least one electrode according to the present invention.

The present invention provides electrodes having an increased content of active material, based on the total weight of the electrode, for electrochemical energy storage systems and fuel cells. The energy that is storable or generatable in an electrochemical cell that includes the electrode according to the present invention is thus increased. In addition, due to the specific configuration of the electrode, the risk of a short circuit is reduced, since the surface sections in which the electrically conductive current conductor, which is generally metallic, is present in uncoated form is significantly reduced. The risk of contact between the current collectors of two electrodes or between a current collector and the housing of an energy storage cell or fuel cell is thus likewise minimized. Furthermore, the electrode according to the present invention is manufacturable in a simple and cost-effective manner.

Specific embodiments of the present invention are described in greater detail with reference to the drawings and the following description.

DETAILED DESCRIPTION

Figure 1A:
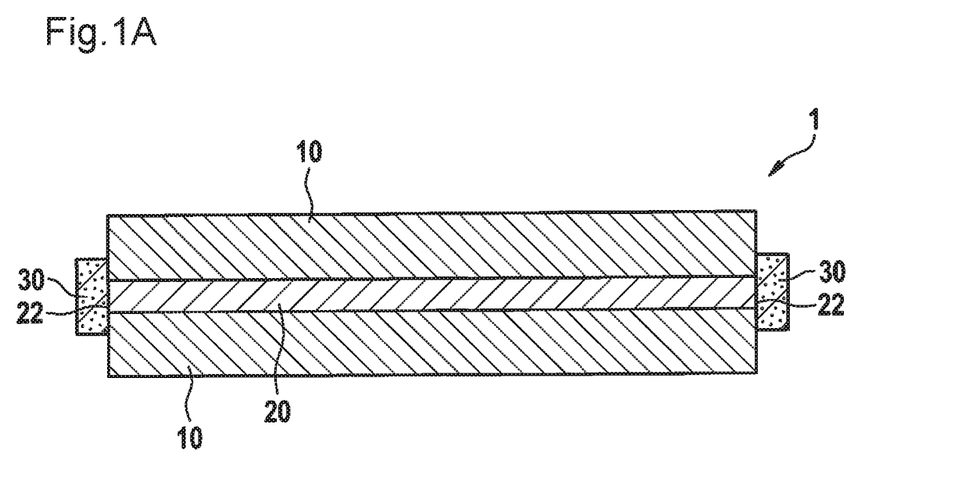
FIG. 1A shows a schematic illustration of a conventional electrode.

FIG. 1A illustrates the side view of a conventional electrode 1, which includes a current collector 20 with active material foil 10 situated on each of its surfaces. Areas of current collector 20 that are not coated by active material foil 10, in particular edges 22 of flat current collector 20, are provided with an electrically nonconductive coating 30, made of $Al_2O_3$, for example, in an additional method step.

Figure 1B:
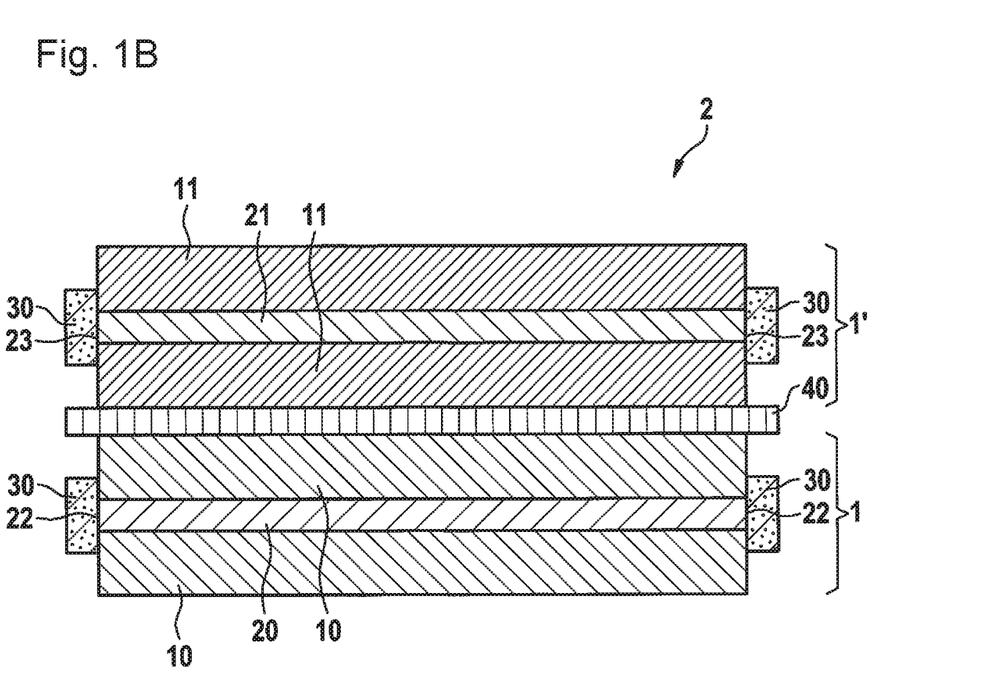
FIG. 1B shows a schematic illustration of a conventional electrode stack made up of two electrodes and a separator.

FIG. 1B depicts a conventional electrode stack 2 which includes two electrodes 1, 1' and a separator 40 situated between electrodes 1, 1'. Electrodes 1, 1' include a current collector 20, 21 and at least one, which may be at least two, active material foil(s) 10, 11. Although electrodes 1, 1' have an identical configuration, they may differ from one another by the selection of the materials of the particular separator 40 and the materials of active material foils 10, 11 in order to form a positive electrode (cathode) and a negative electrode (anode). Areas of current collector 20 that are not covered by active material foils 10, 11, in particular edges 22, 23 of flat current collector 20, 21, are provided with a coating 30. Separator 40 is configured in such a way that it protrudes beyond the outer boundaries of electrodes 1, 1'.

Figure 1C:
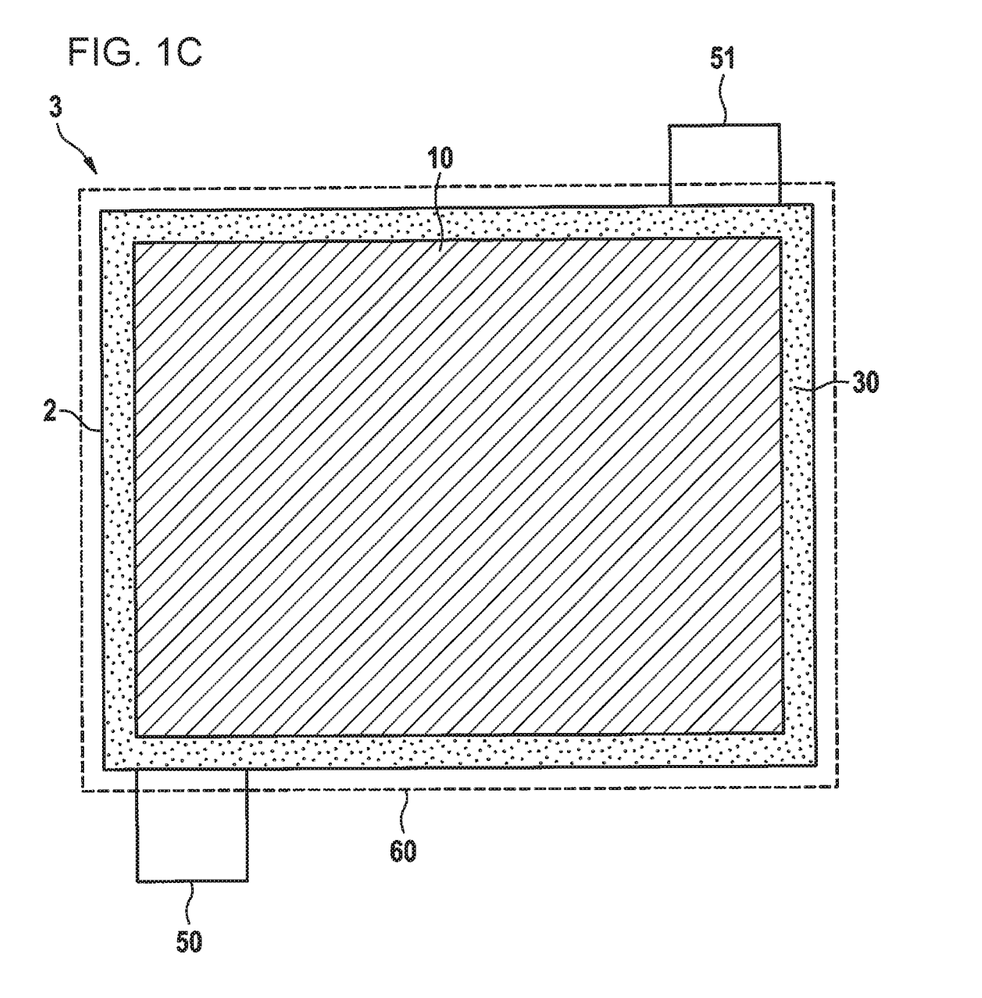
FIG. 1C shows a schematic illustration of an electrochemical cell that includes an electrode stack according to FIG. 1b, situated in a housing.

FIG. 1C shows a conventional electrochemical cell 3 which includes at least one electrode stack 2 according to FIG. 1b that is situated in a housing 60. The perspective shows electrochemical cell 3 in the top view with an active material foil 10 of a first electrode 1 in the foreground. Arrester 50 is situated on current collector 20 of this electrode 1. Current collector 20 is covered with active material foil 10 and circumferentially covered by coating 30. Of second electrode 1' of electrode stack 2, only arrester 51 is visible.

Figure 2A:
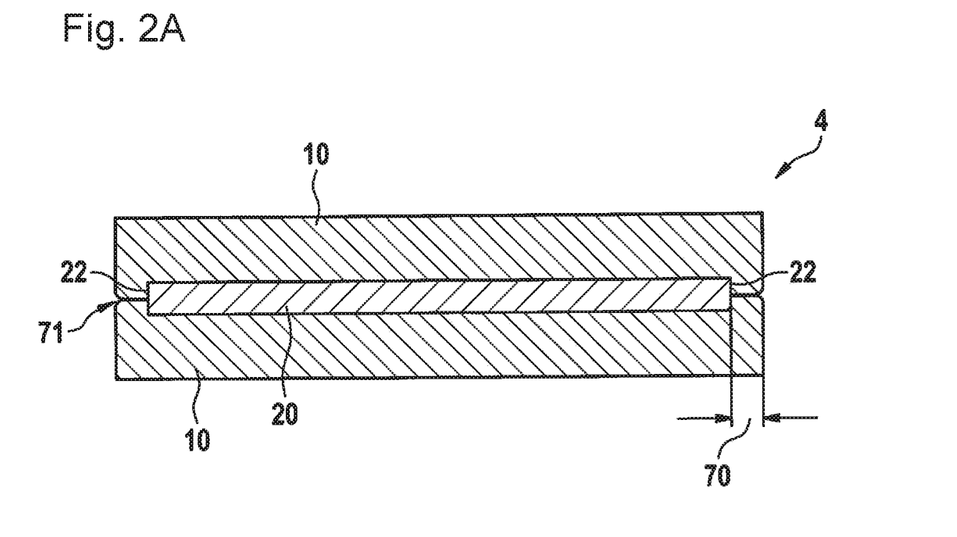
FIG. 2A shows a schematic illustration of an electrode according to the present invention.

FIG. 2A schematically illustrates an electrode 4 according to the present invention in the side view. The electrode includes a current collector 20 that is made of an electrically conductive material such as aluminum or copper. Current collector 20 has a flat configuration. An active material foil 10 is situated on each of the surfaces of current collector 20. Active material foils 10 are configured in such a way that they protrude beyond the outer boundary of current collector 20. This results in an overhang 70 of active material foils 10 past current collector 20, in particular beyond edges 22 of flat current collector 20. This overhang 70 may have an extension of no more than 5 mm. In the area of overhang 70, active material foils 10 may form an adhesive bond 71 with one another, which may be achieved by pressing, for example.

Figure 2B:
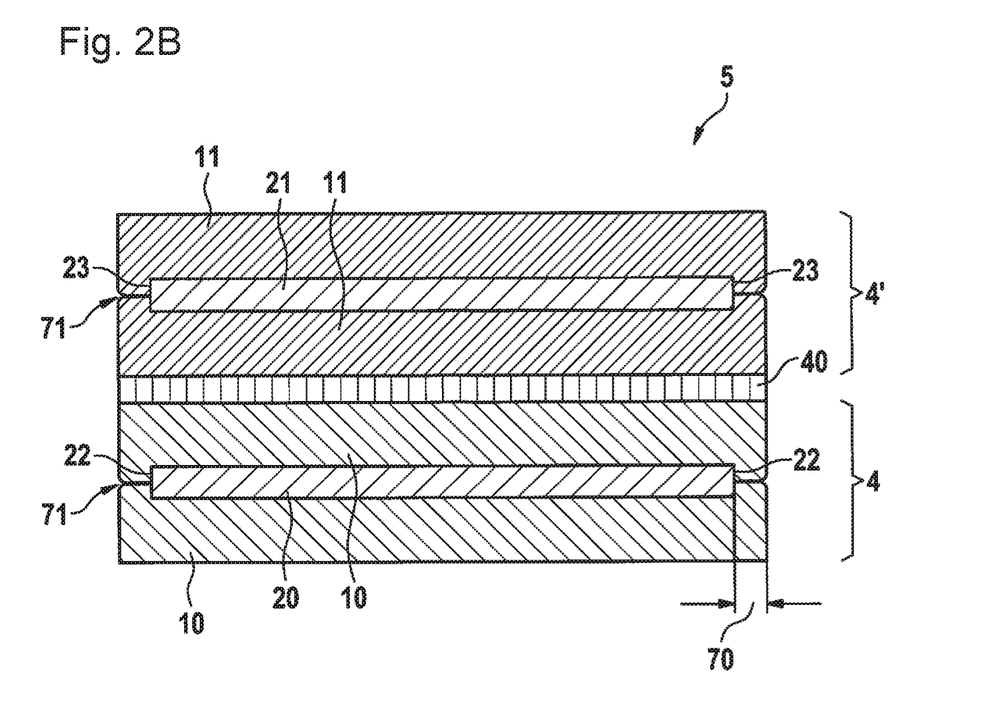
FIG. 2B shows a schematic illustration of an electrode stack according to the present invention made up of two electrodes and a separator.

FIG. 2B shows an electrode stack 5 according to the present invention, which includes two electrodes 4, 4' and a separator 40 situated between electrodes 4, 4'. Electrodes 4, 4' include a current collector 20, 21 and at least one, which may be at least two, active material foil(s) 10, 11. Although electrodes 4, 4' have an identical configuration, they may differ from one another by the selection of the materials of the particular separator 40 and the materials of active material foils 10, 11 in order to form a positive electrode (cathode) and a negative electrode (anode). Separator 40 may be configured in such a way that it has the same size as electrodes 4, 4'. An overhang 70 of separator 40 is not necessary. Due to overhang 70 according to the present invention of active material foils 10, 11 beyond the surface of the particular current collector 20, in particular beyond edges 22, 23 of flat current collector 20, 21, current collector 20, 21 is protected, and at the same time the portion of the volume of active material in electrode stack 5 is increased.

Figure 2C:
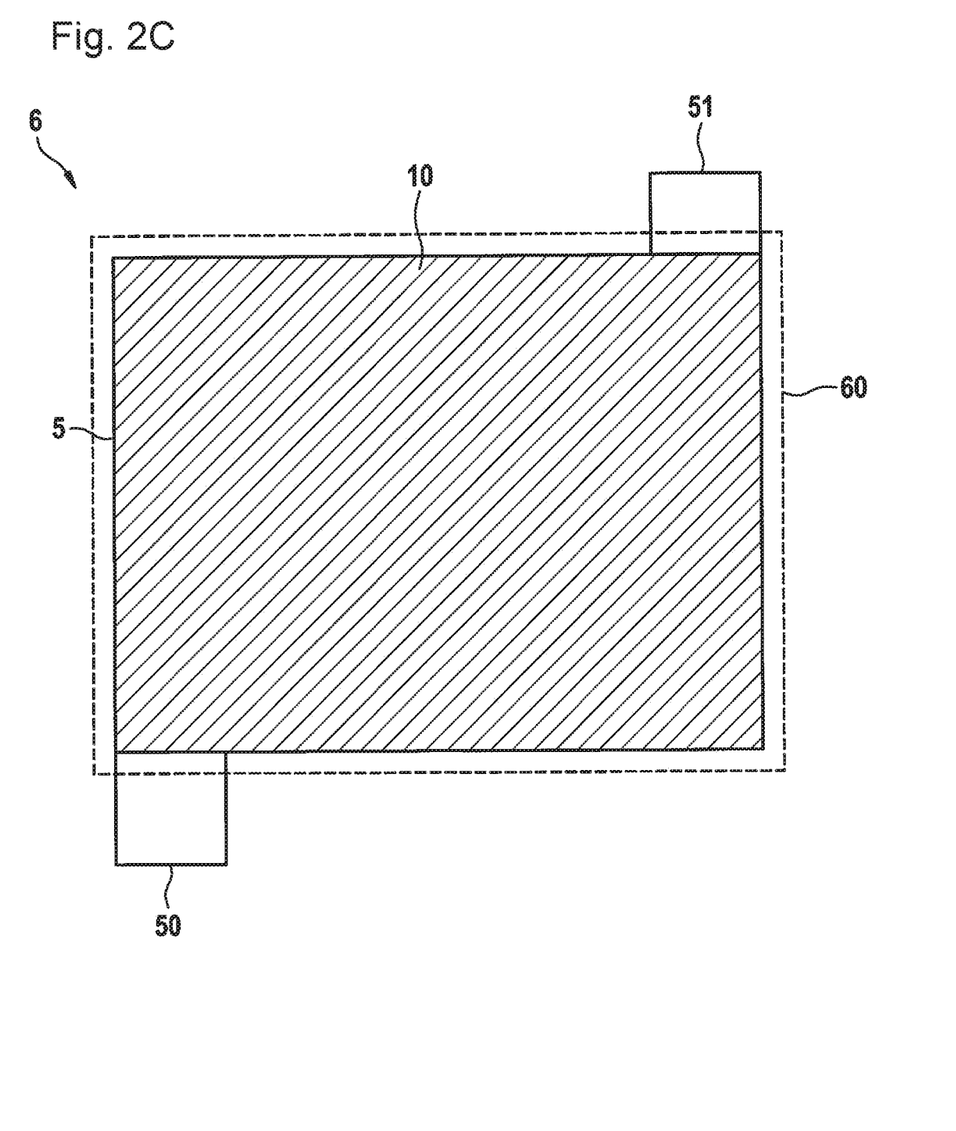
FIG. 2C shows a schematic illustration of an electrochemical cell that includes an electrode stack according to FIG. 2B, situated in a housing.

FIG. 2C shows an electrochemical cell 6 according to the present invention which includes at least one electrode stack 5 according to FIG. 2B, which is situated in a housing 60. The perspective shows electrochemical cell 6 in the top view with an active material foil 10 of a first electrode 4 in the foreground. Arrester 50 is situated on current collector 20 of this electrode 4. Current collector 20 is completely covered with active material foil 10. An additional coating is not necessary. Of second electrode 4' of electrode stack 5, only arrester 51 is visible.

Figure 3A:
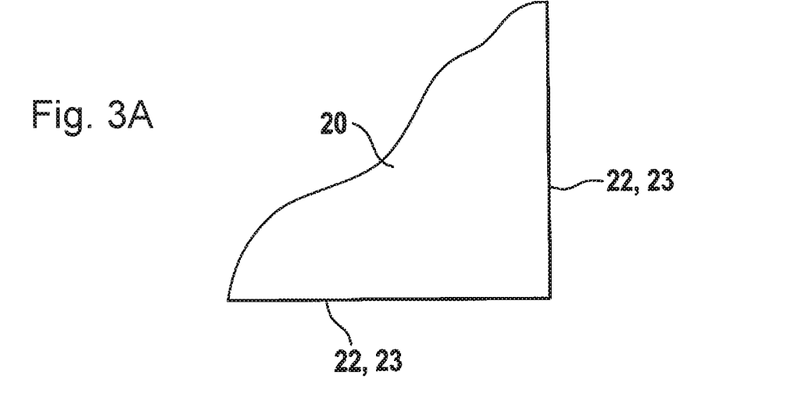
FIG. 3A shows a schematic illustration of a first embodiment according to the present invention of the border area of the current collector.
Figure 3B:
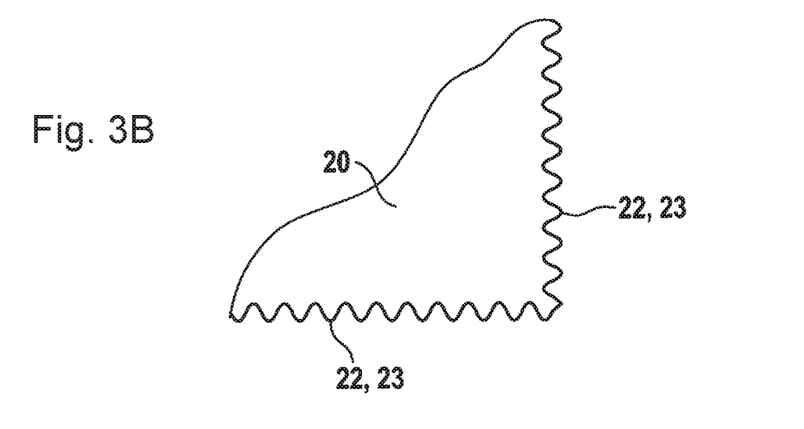
FIG. 3B shows a schematic illustration of a second embodiment according to the present invention of the border area of the current collector.
Figure 3C:
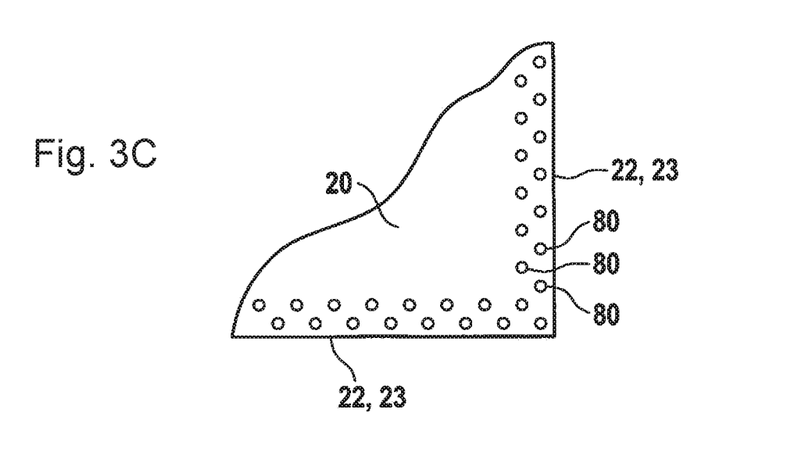
FIG. 3C shows a schematic illustration of a third embodiment according to the present invention of the border area of the current collector.

FIGS. 3A through 3C show various embodiments of the border areas of current collector 20, 21. The embodiment according to FIG. 3a is provided with smooth edges 22, 23 of current collector 20, 21. The embodiment according to FIG. 3b shows a current collector 20, 21 having undulating edges 22, 23 of current collector 20, 21. Lastly, the embodiment according to FIG. 3c shows a current collector 20, 21 which is provided with a plurality of holes 80 in the border area along edges 22, 23 of current collector 20, 21. These holes, for example as shown in the present illustration, may be offset with respect to one another at regular intervals in two rows.

The present invention is not limited to the exemplary embodiments described here and the aspects highlighted therein. Rather, numerous modifications within the range set forth in the claims are possible which are within the scope of activities carried out by those skilled in the art.

What is claimed is:

1. An electrode, comprising:
    at least one current collector having a flat configuration and to which at least one arrester is attached;
    at least one active material foil, wherein the at least one active material foil is situated on a first surface of the current collector, and protrudes beyond the current collector on all sides along its edges to form an overhang of the active material foil past the outer boundary of the current collector on all sides;
    wherein the at least one active material foil includes at least two active material foils, a first active material foil being situated on the first surface of the current collector, and a second active material foil being situated on a second surface of the current collector, opposite from the first surface of the current collector, so that the current collector is completely enclosed by the at least two material foils, and,
    wherein the active material foil protrudes beyond the at least one current collector on all sides along its edges to form an overhang of the at least one active material foil past the outer boundary of the current collector on all sides.

2. The electrode of claim 1, wherein the current collector is perforated and/or has an undulating configuration on at least a portion of its border area.

3. The electrode of claim 1, wherein the electrode is used in an electrochemical energy storage system or in a fuel cell.

4. An electrochemical energy storage system, comprising:
    at least one electrode, including:
        at least one current collector having a flat configuration and to which at least one arrester is attached;
        at least one active material foil, wherein the at least one active material foil is situated on a first surface of the current collector, and protrudes beyond the current collector on all sides along its edges to form an overhang of the active material foil past the outer boundary of the current collector on all sides;
        wherein the at least one active material foil includes at least two active material foils, a first active material foil being situated on the first surface of the current collector, and a second active material foil being situated on a second surface of the current collector, opposite from the first surface of the current collector, so that the current collector is completely enclosed by the at least two material foils, and,
        wherein the active material foil protrudes beyond the at least one current collector on all sides along its edges to form an overhang of the at least one active material foil past the outer boundary of the current collector on all sides.

* * * * *